United States Patent [19]

Kotzlowski et al.

[11] Patent Number: 5,023,043

[45] Date of Patent: Jun. 11, 1991

[54] ACTIVELY COOLED DEVICE

[75] Inventors: Heinz E. Kotzlowski, Ismaning, Fed. Rep. of Germany; Günter Kneringer, Breitenwang bei Reutte, Austria

[73] Assignees: Max-Planck-Gesellschaft zür Förderung der Wissenschaften e.V., Göttingen, Fed. Rep. of Germany; Schwarzkopf Development Corporation, New York, N.Y.

[21] Appl. No.: 271,390

[22] Filed: Nov. 10, 1988

Related U.S. Application Data

[63] Continuation of Ser. No. 822,410, filed as PCT EP85/00208 on May 7, 1985, abandoned.

[30] Foreign Application Priority Data

May 7, 1984 [DE] Fed. Rep. of Germany ....... 3416843

[51] Int. Cl.$^5$ .............................................. G21B 1/00
[52] U.S. Cl. ..................................... 376/150; 376/136; 165/168; 165/134.1; 165/171; 165/47; 165/169; 228/120; 228/122; 228/183; 228/263.12
[58] Field of Search ...................... 165/168, 134.1, 905, 165/904, 180, 169, 171, 47; 376/136, 150; 228/120, 122, 263.12, 183

[56] References Cited

U.S. PATENT DOCUMENTS

| | | | |
|---|---|---|---|
| 1,989,996 | 2/1935 | Mautsch | 165/134.1 |
| 2,811,761 | 11/1957 | Bauer | 165/168 |
| 2,856,905 | 10/1958 | Bowen, III | 165/134.1 |
| 3,333,123 | 7/1967 | Baumann | 165/169 |
| 4,074,406 | 2/1978 | Boyd et al. | 165/168 |
| 4,134,451 | 1/1979 | Conant et al. | 165/180 |
| 4,235,279 | 11/1980 | Feuchter et al. | 165/169 |
| 4,535,838 | 8/1985 | Gray et al. | 165/134.1 |

FOREIGN PATENT DOCUMENTS 0119497 9/1981 Japan ................... 165/180

OTHER PUBLICATIONS

Kugel, H. W. et al., "The Design of the Poloidal Divertor Experiment Tokamak Wall Armor and Inner Limiter", Nuclear Technology/Fusion, vol. 2, Oct. 1982, pp. 712-722.
Haines, J. R. et al., "Material Considerations for the Fusion Engineering Device (FED) Pump Limiter", ORNL, Journal of Nuclear Materials, 103 & 104 (1981), pp. 223-228.
Donnelly et al., "The Brazing of Graphite", Welding Journal, May 1962, pp. 461-469.
"Journal of Nuclear Materials", 103 & 104 (1981) 31-40, Aug. 1981; R. E. Nygren, Materials Issues in the Fusion Engineering Device.
Japan Atomic Energy Research Institute, (1982), T. Hiraoka, "Application of SiC to First Wall Armor Plate".

*Primary Examiner*—John Ford
*Attorney, Agent, or Firm*—Spencer & Frank

[57] ABSTRACT

An actively cooled device, such as a heat shield for a fusion reactor, includes elements (10) of a heat-resistant material, particularly graphite, each being provided with at least one recess having a circular cross section, particularly a groove (14), into which a cooling pipe (16) conducting a coolant is brazed directly and with surface contact. This produces an effective dissipation of heat from the elements and a more durable connection of the elements with the cooling pipe or pipes.

18 Claims, 3 Drawing Sheets

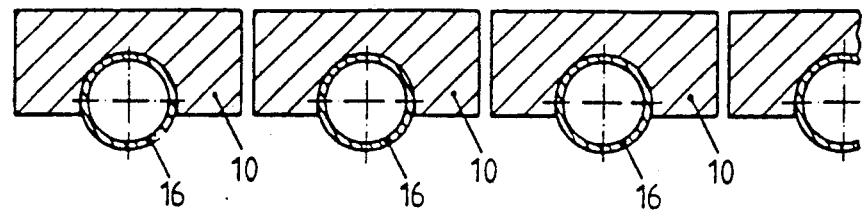
Fig. 2
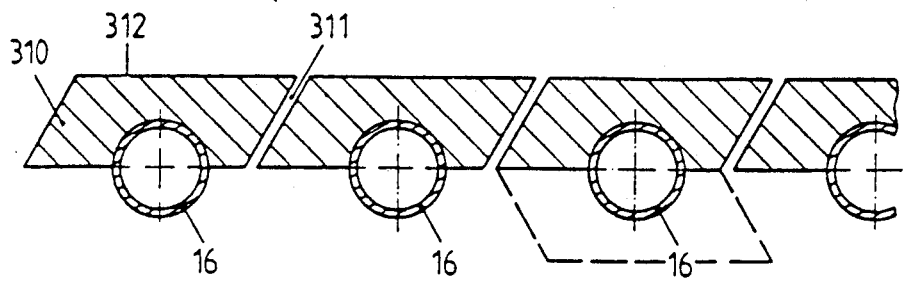
Fig. 3
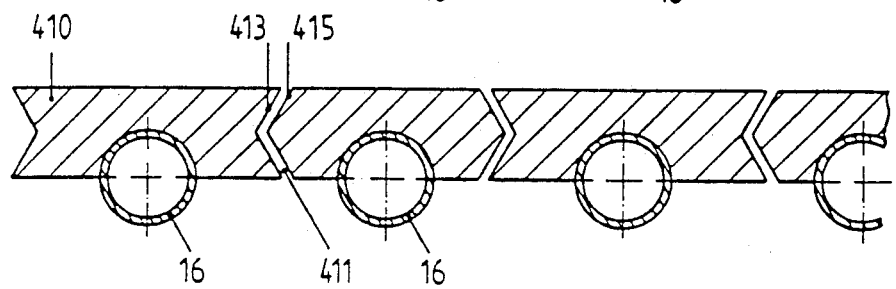
Fig. 4
Fig. 5a  Fig. 5b
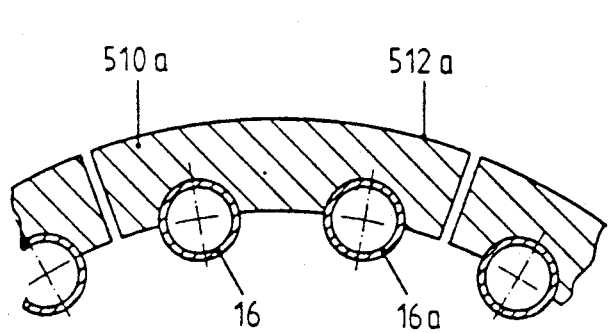
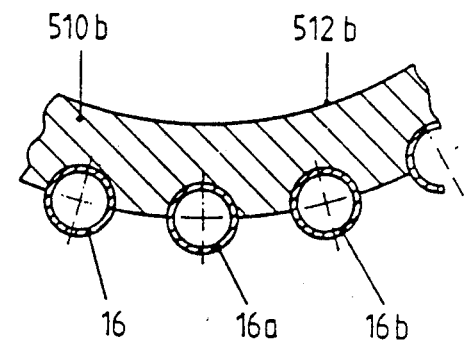
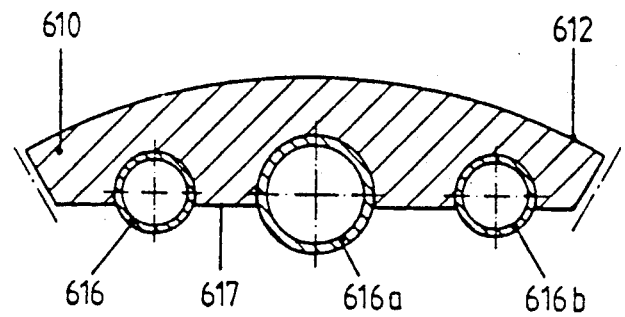
Fig. 6

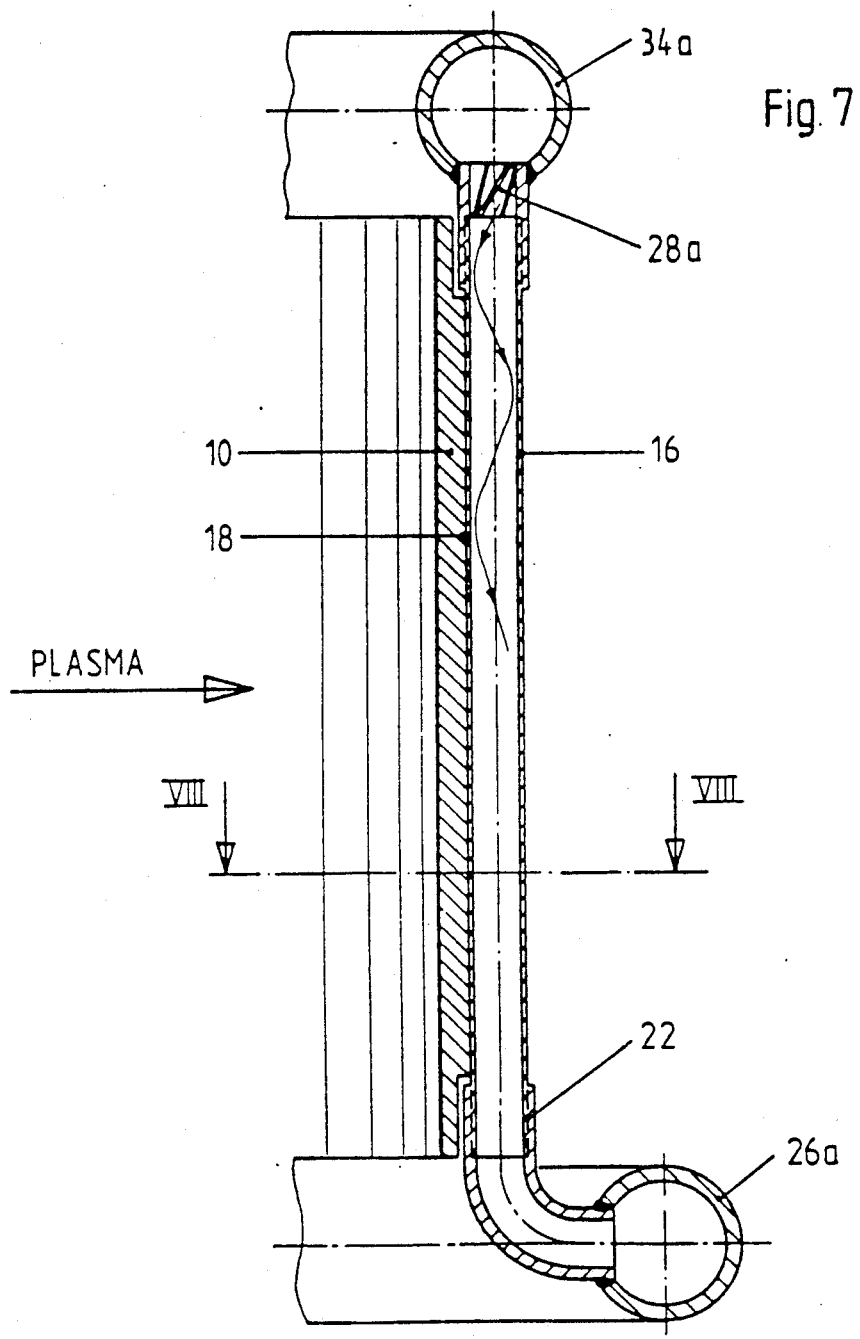
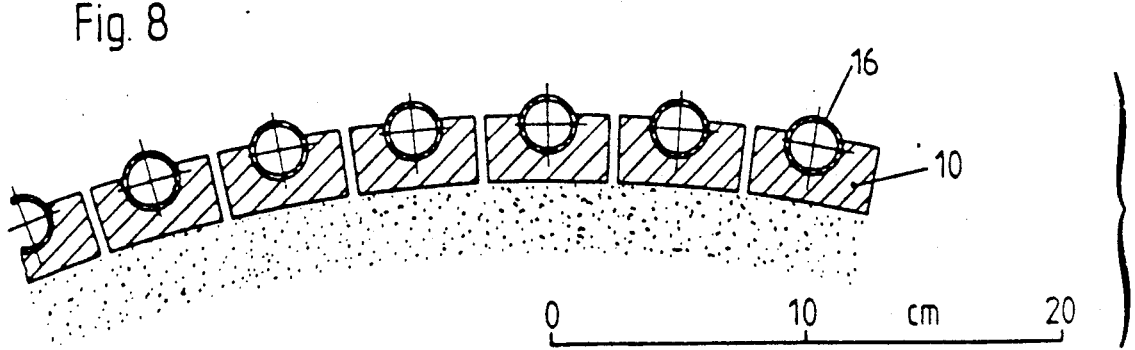

ACTIVELY COOLED DEVICE

This application is a continuation of application Ser. No. 06/822,410, filed as PCT EP85/00208 on May 7, 1985, published as WO85/05214 on Nov. 21, 1985 now abandoned.

BACKGROUND OF THE INVENTION

The present invention relates to an actively cooled device including bodies of heat resistant (i.e. refractry) material which are each surface brazed to at least one coolant conduit.

Many purposes require highly thermally stressable shields, the so-called "heat shields". Typical examples are the diverters and limiters of a fusion reactor. Since heat shields are a preferred field of application for the invention, it will hereinafter be described for the example of heat shields. However, the invention is not limited to them; it can also be used for other actively cooled devices, such as cooled drawing dies for the production of profiled rods, cooled electrodes for fusion electrolysis and the like.

If it meets certain quality requirements, graphite, due to its characteristics, is a good heat shield material for plasma physical systems, such as fusion reactors, and other vacuum systems. Low atomic weight, high sublimation temperature, good heat conduction, and low atomization rate are some of these characteristics. On the other hand, graphite also has various drawbacks, such as porosity, low mechanical strength and low ductility.

The porosity of graphite generally forbids, already for density reasons, direct contact of the graphite with a cooling fluid. Its poor mechanical strength and ductility make the joining of graphite parts more difficult and limit the maximum temperature under which it can be used. In the past, therefore, graphite elements serving as heat shields could be cooled only by radiation or by thermal contact with a heat dissipating fastening structure. The graphite elements of such a known heat shield in an experimental fusion reactor, such as a Tokamak, are therefore adiabatically heated during a plasma discharge which lasts up to about 10 seconds and then require at least about 10 minutes to cool sufficiently. Longer plasma discharges or stationary operation is therefore impossible if the prior art graphite heat shields are used.

Similar problems exist with the so-called first wall of fusion reactors. In this connection, the JAERI-M82-174 (1982) report discloses the soldering of silicon carbide plates to a planar frontal face of strip-like projections formed in a base plate by cooling channels having a trapezoidal cross section. The Journal of Nuclear Materials 103 & 104 (1981) pages 31-40, further discloses a limiter which contains water cooled copper plates to whose surface graphite tiles are brazed. However, the strength of these planar brazed connections leaves something to be desired under the unavoidable alternating temperature and pressure stresses, and cracks frequently develop at the solder locations which greatly impede heat transfer.

Consequently, the present invention is based on the problem of assuring, in a device, e.g. a heat shield, employing elements made of a heat resistant material which are actively cooled by a coolant, the durability of the brazed connections and thus reliable dissipation of heat from the heat resistant elements to the coolant so that greater stressability and/or longer service life result.

SUMMARY OF THE INVENTION

In the present invention, the above-mentioned problems are thus solved in that the bodies or elements of the device are each provided with at least one recess having an at least part circular cross section, into which a member having a corresponding cross section and being part of a metallic cooling pipe is brazed directly and with surface contact. The geometry is preferably and advantageously selected so that the heat transfer surface between the element and the cooling pipe is approximately equal to the thermally stressed surface of the element.

An element may also be brazed directly to a plurality of cooling pipes.

Embodiments of the invention will now be described in greater detail with reference to the drawing for the example of heat shields for fusion reactors.

BRIEF DESCRIPTION OF THE DRAWINGS

FIGS. 2 to 6 show cross-sectional views of various embodiments of heat shields according to the invention;

FIGS. 7 and 8 show a longitudinal sectional view and a cross-sectional view, respectively, of a further embodiment of the invention with cooling pipes held at two sides.

DETAILED DESCRIPTION OF THE INVENTION

Figure 1A:
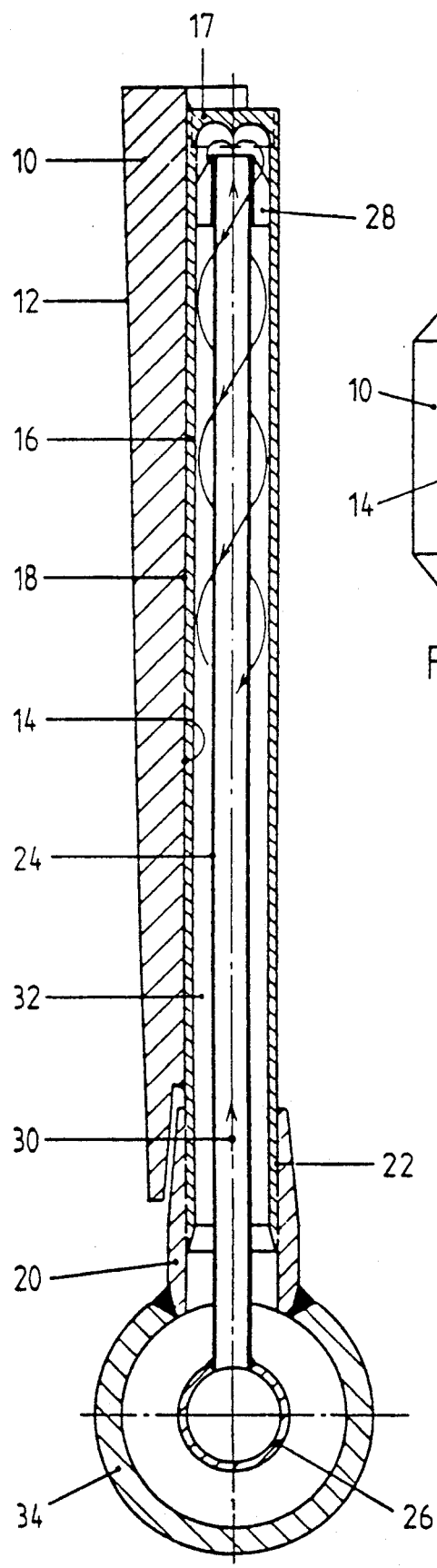
FIG. 1a, FIG. 1b and FIG. 1c show a longitudinal sectional view seen from the side, a frontal view and a plan view of an actively cooled heat shield element according to a preferred embodiment of the invention.

An actively cooled device according to the invention includes at least one, generally a plurality of, e.g. strip or plate shaped elements of a heat resistant material which are each brazed directly to at least one coolant conduit (cooling pipe). Preferably, the cooling pipe has a circular cross section and is brazed to the element to be cooled over its entire exterior surface or over part of the circumference of the exterior surface. To realize the best possible contact between the coolant flowing through the cooling pipe and the interior wall of the cooling pipe to be cooled, the coolant may also be conducted in a helical manner by guide metal sheets in the cooling pipe. A plurality of cooling pipes may be brazed to one body or element.

Nonmetallic materials, among them graphite, are preferred as heat resistant materials so that hereinafter reference will be made to graphite elements. However, other heat resistant materials may correspondingly be used. For use in fusion reactors, the material should have a low atomic number Z. Suitable materials, other than graphite, are, for example, carbides such as SiC, TiC, $B_4C$, also $TiB_2$, sintered materials, ceramics, metal ceramic composite substances and certain metals, such as beryllium.

In addition to the dissipation of heat, the metal cooling pipe preferably also serves as mechanical support for the element to be cooled, particularly to absorb the weight of the element to be cooled and other forces acting on the element. This has the great advantage that the mount is at the temperature of the coolant and not at the temperature of the element to be cooled. The element to be cooled is mechanically fastened to the cooling pipe over a large area by way of the brazed connection in the recess, that is without screws, springs or similar fastening elements. The cooling pipe should be thin walled, i.e. its wall thickness should at most be about 10% of the exterior diameter. However, the wall thickness must be sufficient to avoid noticeable deformations during operation.

A durable and resistant brazed connection of graphite and metal is assured only if the metal has at least approximately the same coefficient of thermal expansion as graphite. This requirement is met, for example, by high melting point metals, such as molybdenum and some molybdenum alloys. Since these materials are relatively expensive and difficult to work with and to weld, only those parts of the coolant conduit which are brazed to a graphite element are made of these metals while the remainder of the coolant conduits is manufactured of conventional materials, such as austenitic high-grade steel. The connection between the cooling pipes of molybdenum or molybdenum alloy and the parts of the coolant conduit made of other materials may be effected by a conical or cylindrical brazed connection. Preferably, this connection includes a shrink fit in that the coolant pipe is made of austenitic high-grade steel or another suitable material and encloses the cooling pipe of molybdenum or a molybdenum alloy in a shrink fit so as to relieve the brazed connection of mechanical tensile stresses.

In plasma physical devices, the heat shield may be exposed to quickly changing magnetic fields. In this case, the cooling elements may be given a finger-like shape so that no conductive loops exist through which electromagnetic forces are generated which would excessively mechanically stress the heat shield. With a finger-like configuration of the cooling element, the coolant is supplied through a second coaxial pipe in the actual cooling pipe, with the cooling power being increasable by helical conduction of the coolant.

Figure 1B:
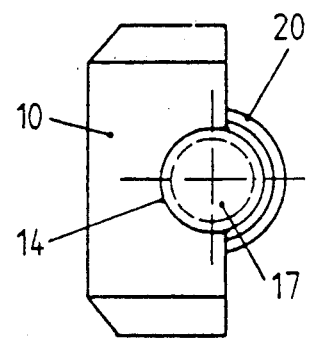
Figure 1C:
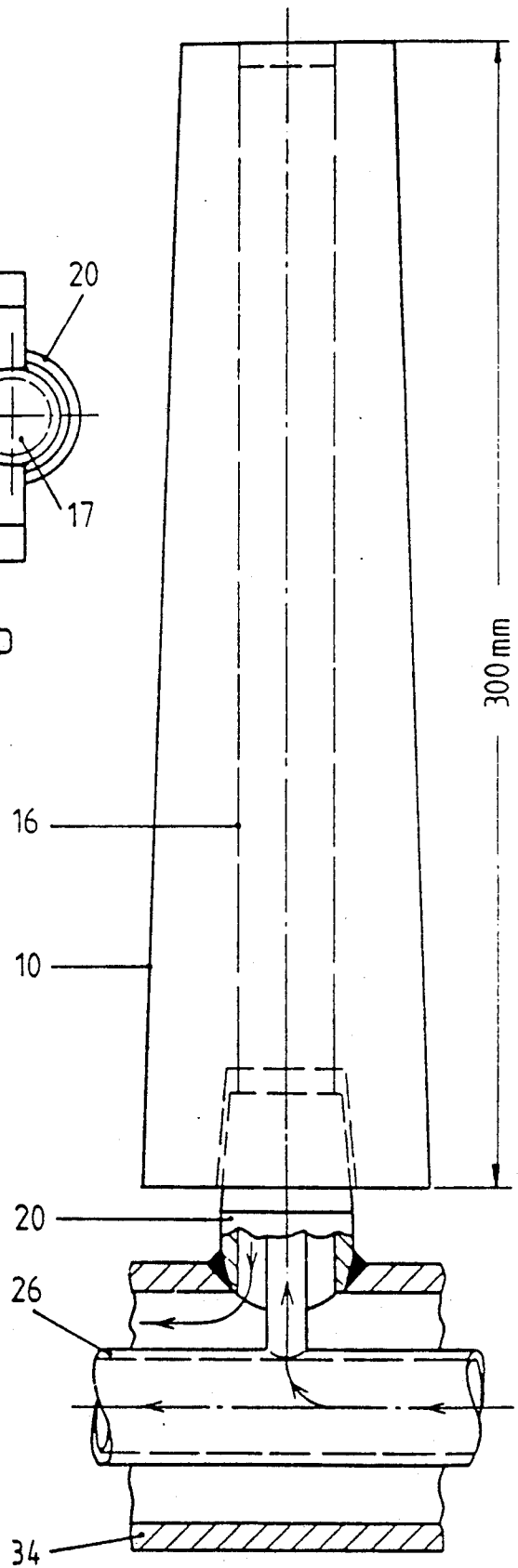

One embodiment of a heat shield element for a fusion reactor in which the above points are considered is shown in FIGS. 1a through 1c. The heat shield element shown in FIG. 1 is a diverter plate element for an experimental fusion reactor of the ASDEX Upgrade type. It includes a plate-like element 10 of highly pure graphite, with the element having a weakly trapezoidal shape when seen in a top view. Element 10 has a planar top surface 12 which, during operation, faces a heat source, e.g. a plasma discharge. The underside is provided with a groove 14 having a U-shaped cross section and a semicircular bottom portion. A cooling pipe 16 having a circular cross section is seated in groove 14 and is brazed, over approximately somewhat more than half its circumference, to the surface of groove 14 of graphite element 12 as indicated in FIG. 1a by reference numeral 18. Alternatively, the front end (on the left in FIG. 1a) of groove 14 may be expanded to provide room for a cap (not shown) which is brazed to the end of the cooling pipe.

The wedge-shaped gaps between the planar wall portions of the recess having the U-shaped cross section and the cooling pipe are filled with brazing material to provide the largest area possible for the heat conductive connection between the cooling pipe and the graphite element.

In the illustrated embodiment of the invention, cooling pipe 16 was made of molybdenum and had an exterior diameter of 24 mm and a wall thickness of 2 mm. A 3 [percent] titanium, 27 [percent] copper, 70 [percent] silver alloy served as brazing material.

The brazed connection between the graphite and the cooling pipe may also be made by means of another known brazing material, see, for example, U.S. Pat. No. 3,673,038. Other suitable hard solders are, for example, copper-titanium alloys, pure titanium, zirconium and their alloys. Since the ductility of the brazing materials decreases with increasing melting temperature (in the above examples a maximum of about 1670° C.) and the connection thus becomes brittle and subject to cracking more easily, generally a brazing material will be employed which has the lowest possible melting point (melting point about 400° K. above the operating temperature).

Cooling pipe 16 is closed at one end and connected, at the other end, with a coolant conduit pipe 20, which is made of austenitic high-grade stainless steel. The connection between cooling pipe 16 of molybdenum or a molybdenum alloy and conduit pipe 20 of high-grade steel or another conventional material is effected by a brazed connection 22, with the inner diameter of conduit pipe 20 preferably being dimensioned such that conduit pipe 20 is seated on cooling pipe 16 in a shrink fit and brazed connection 22 is thus mechanically relieved.

Coolant is supplied through an interior pipe 24 made, e.g., of high-grade steel and extending from a coolant distributor 26 coaxially into cooling pipe 16, ending shortly before the inner face of cap 17 which is provided with an annular flow deflection groove. At the front end of coolant supply pipe 24, guide metal spirals 28 are arranged in the space between pipes 24 and 16 in such a manner that a helical twist is imparted to the coolant flow, as indicated by arrows, so that the heat transfer between the interior wall of cooling pipe 16 and the coolant is improved. Thus, the coolant flows through the interior 30 of inner pipe 24 to the front end of cooling pipe 16 and then through space 32 between the two pipes 16 and 24, back to a coolant collecting pipe 34.

The strip or finger-like shape of the heat shield elements shown in FIG. 1 avoids large, closed conductive loops in which alternating magnetic fields could generate undesirable forces.

FIG. 2 shows a somewhat simplified cross section of part of a heat shield made of the elements according to FIG. 1. Since, in the above-mentioned experimental reactor, the diverter plates are nonuniformly thermally stressed, the thickness of the graphite elements was selected to be approximately proportional to the thermal stress so that uniform heating of the graphite elements is assured during a longer (e.g. 10 seconds) plasma discharge.

FIG. 3 shows a somewhat different embodiment of a heat shield of the type shown in FIG. 2. The elements of the heat shield according to FIG. 3 include graphite elements 310 having parallelogram-shaped cross sections, so that interstices 311 between the individual graphite heat shield elements extend obliquely to surface 312 of the graphite elements. The heat shield according to FIG. 3 is optically tight if the heat source is localized in such a manner that no heat radiation can pass through interstices 311.

FIG. 4 is a cross-sectional view of a heat shield which is also optically tight with respect to a spatially expanded heat source. As can be seen, the heat shield elements contain plate-shaped graphite elements 410 whose facing side faces are provided with V-shaped grooves 413 or wedge-shaped complementary projections 415 which project thereinto so that interstices 411 are angled.

FIGS. 5a and 5b are cross-sectional views of heat shield elements having bent, plate-shaped graphite elements 510a and 510b, respectively, which have a convex surface 512a and a concave surface 512b, respectively, facing the heat source. On its side facing away from the heat source, graphite element 510a is brazed to two cooling pipes 16 and 16a, while graphite element 510b is brazed to a plurality of cooling pipes 16, 16a, 16b, . . . . Graphite elements 510a and 510b have an essentially uniform thickness.

FIG. 6 shows an embodiment of the element of a heat shield according to the invention which includes a graphite body 610 having an approximately arc-shaped cross section, with its convex face 612 facing the heat source. The opposite side 617 is planar and is provided with three grooves into which three cooling pipes 616, 616a, 616b are brazed. The center cooling pipe 616a has a larger diameter than the two outer cooling pipes 616, 616b.

Of course, the use of a plurality of cooling pipes for one graphite body and/or the use of cooling pipes having different diameters is not limited to the exemplary graphite element configurations shown in the drawings. Thus, if each graphite element is brazed to only one cooling pipe, not all cooling pipes need have the same diameter.

The cooling pipe or cooling pipes may of course also be completely surrounded by graphite. For example, cooling pipes 16 of FIGS. 2 to 4 may also be brazed to a further graphite element at their side shown free in these figures as is indicated in dashed lines, for example, in FIG. 3 for one heat shield element. The cooling pipes may also be brazed over their full surface area into a corresponding bore of the graphite element.

In the heat shield shown in FIGS. 7 and 8, the coolant is introduced from a feeder line 34a at the one, upper end of cooling pipe 16 and exits at the lower end of the cooling pipes into a collecting pipe 26a. At its inlet end, spiral metal guide sheets 28a are provided in cooling pipe 16 so as to impart a helical twist to the flow of coolant, as explained in connection with metal guide sheets 28 in conjunction with FIG. 1a. Conduits 26a and 34a simultaneously serve as mechanical mounts for the heat shield elements. Otherwise, the heat shield elements correspond to those of FIG. 1 so that further explanations are unnecessary.

FIG. 8 is a sectional view in a plane VIII—VIII of FIG. 7 and shows how a plurality of heat shield elements can be arranged in juxtaposition. The grooves, into which the cooling pipes are brazed, here likewise have a U-shaped cross section and are somewhat deeper than one-half the exterior diameter of the respectively brazed-in cooling pipe. Of course, elements having different shapes can also be employed here, for example those shown in FIGS. 3 and 4.

The above-described embodiments can of course be modified in various ways without limiting the scope of the invention. In particular, statements of materials, dimensions and intended applications must not be interpreted to be limiting. For example, molybdenum alloys or also less expensive materials, such as Ni-Fe or Ni-Fe-Co alloys can also be employed for the cooling pipes instead of molybdenum, if, for example, magnetic characteristics play no part and operating temperatures are not too high.

We claim:

1. An actively cooled heat shield for use at a high temperature range, as is present in a fusion reactor, comprising:
   at least one body made of a refractory material, said body having a thermally stressed surface facing the fusion reactor and an opposing surface, the opposing surface having at least one recess, the at least one recess being at least partially arc-shaped in cross-section:
   a respective metal cooling pipe disposed in the respective at least one recess and thermally coupled thereto, the cooling pipe having a cross-section complementary to the cross-section of the respective recess in which the cooling pipe is disposed, forming a heat transfer surface, the cooling pipe being brazed along the entire heat transfer surface to the refractory body; and
   a cooling medium circulating in the cooling pipe.

2. The heat shield device as defined in claim 1, including a plurality of said bodies which are closely aligned and each of which have at least one cooling pipe brazed thereto.

3. Devices according to claim 2, wherein at least one refractory body has a plurality of said recesses which are of different sizes and in which a respective plurality of cooling pipes having different diameters are brazed.

4. Device according to claim 2, wherein the bodies have elongated shapes, whereby conductive loops cannot be established in electromagnetic fields present in the fusion reactor.

5. Device according to claim 1, wherein the recess is a groove having an at least partial cylindrical surface and the complementary cooling pipe has a circular cross section.

6. Device according to claim 5, wherein the recess has a U-shaped cross section and is deeper than one-half the exterior diameter of the complementary cooling pipe.

7. Device according to claim 2, wherein the bodies each have at least one recess configured as a bore into which a cooling pipe is brazed.

8. Device according to claim 1, wherein the refractory material is selected from the group consisting of graphite, carbides, ceramics, and composite metal-ceramic materials.

9. Device according to claim 1, wherein cooling pipes brazed to the at least one body are each composed of a metal having essentially the same coefficient of thermal expansion as the refractory material and are each connected to a coolant conduit made of another material.

10. Device according to claim 9, wherein the connection between each cooling pipe and the coolant conduit includes a shrink fitted seat around the cooling pipe.

11. Device according to claim 1, wherein each refractory body is supported mechanically by the cooling pipes to which it is brazed.

12. Devices according to claim 1, wherein the at least one refractory body has a plurality of said recesses which are of different sizes and in which a respective plurality of cooling pipes having different diameters are brazed.

13. Device according to claim 1 wherein the at least one body has the shape of an elongated strip.

14. Device according to claim 2, wherein the bodies are juxtaposed to one another with interstices therebetween, said interstices having such a configuration that thermal radiation from a heat source to be shielded is unable to pass in a straight line through the interstices.

15. Device according to claim 8, wherein cooling pipes brazed to the respective at least one body are each composed of a metal having essentially the same coefficient of thermal expansion as the refractory material and are each connected with a coolant conduit made of another material.

16. Device according to claim 1 wherein the refractory material is selected from the group consisting of graphite, a carbide, and beryllium.

17. Device according to claim 1, wherein the refractory material is selected from the group consisting of graphite, SiC, TiC, $B_4C$, and beryllium.

18. Device according to claim 1, wherein each respective body of refractory material has the form of a solid block.

* * * * *